(12) United States Patent
Amtmann et al.

(10) Patent No.: US 7,880,587 B2
(45) Date of Patent: Feb. 1, 2011

(54) COMMUNICATION SYSTEM AND ANTI-COLLISION METHOD

(75) Inventors: Franz Amtmann, Graz (AT); Roland Brandl, Graz (AT); Christian Scherabon, Graz (AT); Hubert Watzinger, Graz (AT)

(73) Assignee: NXP B.V., Eindhoven (NL)

( * ) Notice: Subject to any disclaimer, the term of this patent is extended or adjusted under 35 U.S.C. 154(b) by 825 days.

(21) Appl. No.: 10/575,834

(22) PCT Filed: Oct. 12, 2004

(86) PCT No.: PCT/IB2004/052064

§ 371 (c)(1),
(2), (4) Date: Apr. 13, 2006

(87) PCT Pub. No.: WO2005/039120

PCT Pub. Date: Apr. 28, 2005

(65) Prior Publication Data

US 2007/0273482 A1 Nov. 29, 2007

(30) Foreign Application Priority Data

Oct. 15, 2003 (EP) .................................. 03103822

(51) Int. Cl.
*H04Q 5/22* (2006.01)
*H04L 1/14* (2006.01)
(52) U.S. Cl. .................... 340/10.2; 340/10.1; 340/10.4; 714/750
(58) Field of Classification Search ................ 340/10.2
See application file for complete search history.

(56) References Cited

U.S. PATENT DOCUMENTS

| 4,691,202 | A | * | 9/1987 | Denne et al. ............... 340/10.2 |
| 5,266,925 | A | * | 11/1993 | Vercellotti et al. .......... 340/505 |
| 5,323,149 | A | * | 6/1994 | Hoult et al. ................ 340/10.2 |
| 5,761,570 | A | | 6/1998 | Sawayama et al. |
| 6,265,962 | B1 | * | 7/2001 | Black et al. ................ 340/10.2 |
| 6,377,203 | B1 | * | 4/2002 | Doany ......................... 342/44 |

* cited by examiner

*Primary Examiner*—Daniel Wu
*Assistant Examiner*—Mark Rushing (57) ABSTRACT

In a receiving method for the contactless reception of identification information (I1,I2), which is stored in a data carrier (3, 3') and which can be received from the data carrier (3, 3) in a contactless manner in the form of information units (IU, IU') with a communication device (2), it is envisaged that firstly an information unit (R.IU) is received and that secondly it is detected that the received information unit (R.IU) represents a collision of two different information units (IU, IU') occurring essentially simultaneously, of which two different information units (IU, IU') the one information unit (IU) originates from a first data carrier (3) and the other information unit (IU') originates from a second data carrier (3'), and that thirdly a received information unit (R.IU) that represents a collision is replaced with a first replacement information unit (R.IU1) established by the communication device (2), which is used instead of the information unit (R.IU) representing the collision, as the information unit (IU) that originates from the first data carrier (3), and that fourthly, the first replacement information unit (R.IU1) is delivered in a contactless manner.

16 Claims, 5 Drawing Sheets

COMMUNICATION SYSTEM AND ANTI-COLLISION METHOD

The invention relates to a receiving method for the contactless reception of identification information, which has been stored in a data carrier and which can be transferred from the data carrier in a contactless manner in the form of information units to a communication device and can be received with the communication device. The receiving method includes receiving an information unit and detecting that the information unit received represents a collision of two different information units occurring essentially simultaneously, and of which two different information units the first information unit originates from a first data carrier and the second information unit originates from a second data carrier.

The invention further relates to a method of delivery for the contactless delivery of identification information, said identification information being stored in a data carrier and being transmissible from the data carrier in a contactless manner in the form of information units to a communication device, and said method of delivery having the steps presented in the following, namely delivery of an information unit.

The invention further relates to an anti-collision method comprising a receiving method of the type presented in the first paragraph above and comprising a method of delivery of the type presented in the second paragraph above.

The invention further relates to a communication device circuit for a communication device, said communication device being designed for contactless communication with a data carrier, and in which data carrier identification information is stored, which can be received from the data carrier in a contactless manner in the form of information units. First receiving means are provided for contactless reception of an information unit, and collision detection means are provided for detecting that the received information unit represents a collision of two different information units occurring essentially simultaneously, and of which two different information units the one information unit originates from a first data carrier and the other information unit originates from a second data carrier.

The invention further relates to a communication device with a communication device circuit of the type presented in the fourth paragraph.

The invention further relates to a data carrier circuit for a data carrier, said data carrier being designed for contactless communication with a communication device in which data carrier identification information is stored, which can be transferred from the data carrier in a contactless manner in the form of information units to the communication device, and second delivery means are provided, which are designed for delivery of an information unit in a contactless manner.

The invention further relates to a data carrier with a data carrier circuit of the type presented in the sixth paragraph.

The invention further relates to a communication system for contactless communication comprising a communication device, which has a communication device circuit of the type presented in the fourth paragraph, and comprising at least one data carrier, which has a data carrier circuit according to the circuit presented in the sixth paragraph.

Such a receiving method, said method of delivery, said anti-collision method, said communication device circuit, said communication device, said data carrier circuit, said data carrier, and said communication system are known from U.S. Pat. No. 5,761,570.

In the known communication system, by means of which the known anti-collision method can be carried out, it is envisaged that an information unit is received at the communication device. In said anti-collision method, the known receiving method can be carried out by means of the known communication device circuit and the known method of delivery can be carried out by means of the known data carrier circuit. On the basis of the received information unit it is then detected, that the received information unit represents a collision of two different information units occurring essentially simultaneously, and of these two different information units, one information unit originates from a first known data carrier and the other information unit originates from a second known data carrier. A collision is thus detected in this case of operation.

In the known communication system, there is the problem that, after detection of a collision of information units occurring essentially simultaneously, a display signal is delivered from the communication device by means of a carrier signal generated in and delivered by the communication device. The display signal can be received and processed by the at least two data carriers. In this connection, there is the additional problem that the display signal received with the data carrier is used for complete termination of delivery of the colliding identification information and that the further delivery of identification information can be resumed at the earliest only after expiry of a calculated time interval using a random number. After this time interval has elapsed, complete identification information is delivered again, from the data carrier for which the shortest time interval was calculated. To avoid causing a collision again during this delivery of the identification information, the communication device must deliver a further signal, namely a so-called "busy signal", shortly after beginning again to receive information units of the identification information, so that all other remaining data carriers remain silent, until they again receive queries regarding their identification information, after the identification information of the data carrier favored by the shortest time interval has been transmitted completely. After that, the remaining data carriers again begin transmitting their identification information simultaneously until a collision is detected again and a data carrier has been selected again from the group of remaining data carriers by calculating the shortest time interval from this group. This method, which is generally known as an anti-collision method or inventory technique, is repeated until all data carriers have delivered their identification information completely and in particular without occurrence of a collision. In this case, there is the problem that calculation of said random number is time-consuming and appropriate means are required in the data carrier. Furthermore, said data carrier and said communication device are in practice unsuitable for applications in which a relatively large number of said data carriers are accommodated practically simultaneously within a communication zone of the communication device and the identification information from all data carriers must be detected as quickly as possible. In said application, the time-consuming process of waiting for expiry of the time interval and the subsequent repeat delivery of the complete identification information are disadvantageous, because quick and efficient transmission of all identification information to the communication device is simply not possible.

It is an object of the invention to avoid the problems described above in said receiving method, said method of delivery, said anti-collision method, said communication device circuit, said communication device, said data carrier circuit, said data carrier, and said communication system, to create an improved receiving method, method of delivery, anti-collision method, communication device circuit, communication device, data carrier circuit, data carrier, and communication system.

To solve the problem presented above, in a receiving method according to the invention, features according to the invention are provided, so that a receiving method according to the invention can be characterized as follows:

A receiving method for contactless reception of identification information stored in a data carrier and transferred from the data carrier in a contactless manner in the form of information units to a communication device and can be received with the communication device, said receiving method comprising reception of an information unit, detection that the received information unit represents a collision of two different information units occurring essentially simultaneously, and of which, the first information unit originates from a first data carrier and the second information unit originates from a second data carrier, replacing the received information unit with a first replacement information unit established by the communication device, which is used instead of the information unit representing the collision, as the information unit that originates from the first data carrier, and delivery of the first replacement information unit in a contactless manner.

To solve the problem presented above, a method of delivery according to the invention is provided, characterized as follows:

Method of delivery for the contactless delivery of identification information, which identification information is stored in a data carrier and can be delivered in a contactless manner in the form of information units from the data carrier to a communication device, said method of delivery comprising: delivering an information unit, checking, after delivery of the information unit, if a first replacement information unit established by the communication device is received from the communication device, continuing delivery of the identification information with the information unit following the information unit previously transmitted to the communication device if either no first replacement information unit is received from the communication device or a first replacement information unit is received and the received first replacement information unit is identical to the information unit previously transmitted to the communication device.

To solve the problem described above, in an anti-collision method according to the invention, it is envisaged that the anti-collision method comprises said receiving method and said method of delivery.

To solve the problem described above, a communication device circuit according to the invention, can be characterized as follows:

A communication device circuit for a communication device, said communication device being designed for contactless communication with a data carrier, storing identification information that can be received from the data carrier in a contactless manner in the form of information units. Said communication device circuit comprising: first receiving means for contactless reception of an information unit, collision detection means for detecting when the received information unit represents a collision of two different information units occurring essentially simultaneously, with one information unit originating from a first data carrier, and the other information unit originating from a second data carrier, replacing means for replacing the received information unit with a first replacement information unit established by the communication device, said first replacement information unit serving as the information unit that originates from the first data carrier instead of the information unit representing the collision, and transmitting means for contactless delivery of the established first replacement information unit.

To solve the problem described above, in a communication device a communication device circuit according to the invention is provided.

To solve the problem described above, a data carrier circuit is provided, characterized as follows:

Data carrier circuit for a data carrier for contactless communication with a communication device, said data carrier storing identification information that can be transmitted from the data carrier in a contactless manner in the form of information units to the communication device, comprising: second transmitting means for delivery of an information unit in a contactless manner, checking means for checking, after delivery of the information unit, if a first replacement information unit established by the communication device is received from the communication device, the second transmitting means continuing delivery of the identification information with the information unit following the information unit previously transmitted to the communication device, if it the checking means establishes that either no first replacement information unit is received from the communication device or a first replacement information unit is received and the received first replacement information unit is identical with the information unit previously transmitted to the communication device.

To solve the problem described above, a data carrier comprising a data carrier circuit according to the invention is provided.

To solve the problem described above, a communication system is provided comprising a communication device comprising a communication device circuit according to the invention and at least one data carrier comprising a data carrier circuit according to the invention.

By providing the measures according to the invention, the advantage is obtained that a collision of different information units is managed by a prompt selection from a first data carrier or a group of first data carriers, so that from the selected first data carrier or from the group of selected first data carriers, the next information unit provided for delivery to the communication device can be transmitted practically without time loss and becomes available for processing in the communication device practically without notable delay despite the previously occurring detection of a collision.

Using a further embodiment, the resulting advantage is obtained that at least in a second data carrier or even a group of second data carriers, whose information unit was involved in the collision, suspension of delivery of information units of the respective identification information is effected by means of the first replacement information unit established and delivered in the communication device, without expensive two-way communication with the communication device. Moreover, in the communication device, the resulting advantage is obtained that a time-consuming subsequent repeated reception of each information unit already received collision-free is avoided, because each information unit already temporarily stored is used for completing the identification information originating from one of the second data carriers. As a result, in the data carrier, the advantage is obtained that delivery of the identification information can be continued at a later time without repeating an information unit already transmitted at a precisely defined position within the identification information.

Using a further embodiment, the advantage is obtained that the information unit involved in the collision and originating from at least one second data carrier is not lost, but is used immediately for replacing the received information unit representing the collision, so that at a later time, only the information units of the second data carrier that have actually not yet been transmitted still have to be received.

Using a further embodiment, the advantage is obtained that a maximally efficient delivery of information units of a second data carrier is ensured, said second data carrier not having previously been selected by the first replacement information unit established in the communication device and transmitted from it, and at a time defined by the communication device and without the need for repeat transmission of the information units from this second data carrier. As a result, the advantage is obtained that each data carrier involved in the collision, i.e. both a first data carrier and a second data carrier, only has to deliver all information units of the respective identification information a single time.

It should be mentioned that the advantages described in connection with the receiving method and the transmission method are also obtained in further embodiments of an anticollision method according to the invention, which comprises the receiving method and the transmission method. The same applies to a communication device, a communication device circuit, a data carrier, a data carrier circuit, and a communication system including a communication device and a data carrier.

These and other aspects of the invention are apparent from and will be elucidated with reference to the embodiment described hereunder.

The invention will be described in more detail in the following on the basis of an embodiment represented in the drawings, but the invention is not limited to this.

Figure 1:
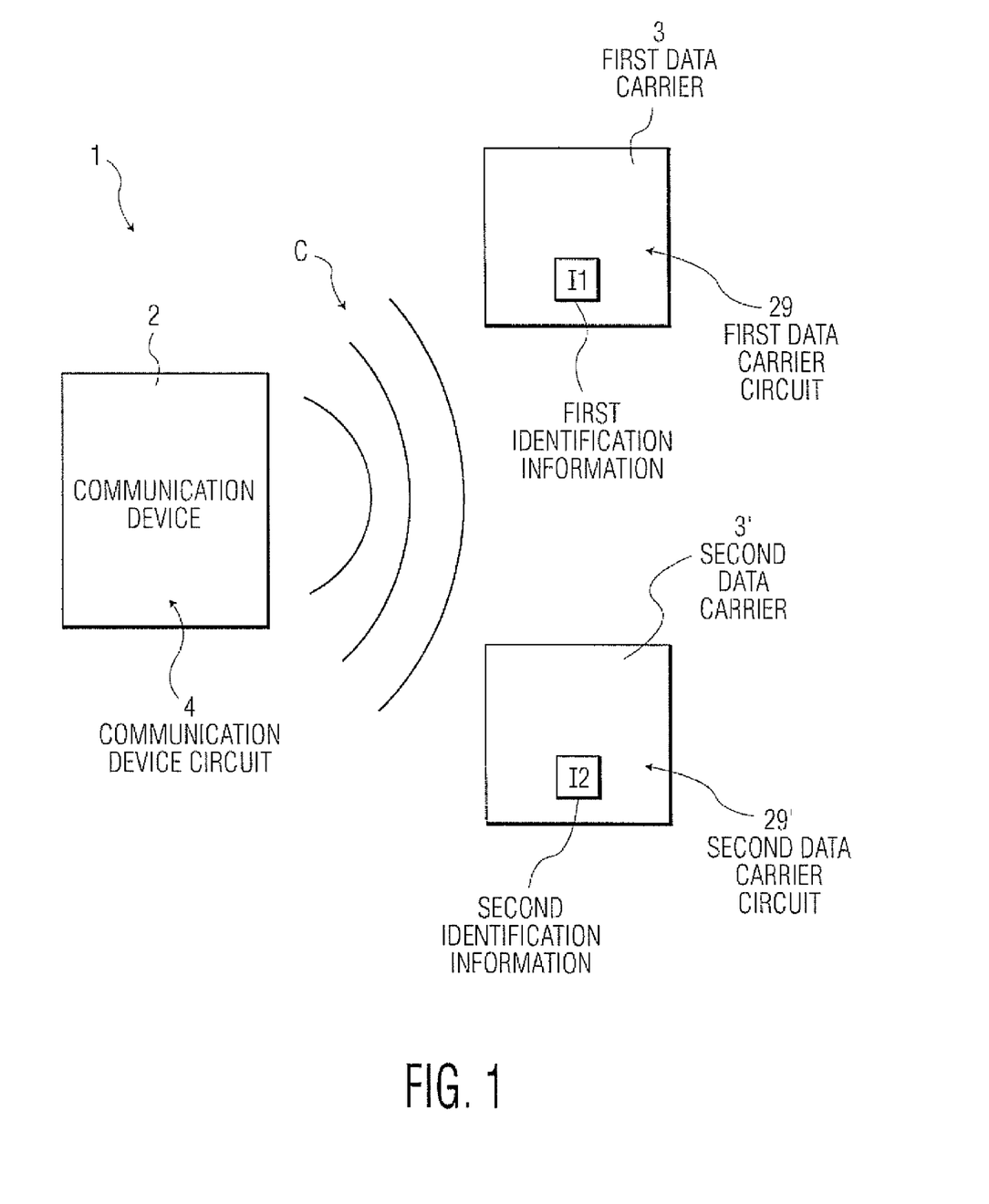
FIG. 1 shows schematically, in the form of a block diagram, a communication system according to the invention.

FIG. 1 shows a communication system 1, which will be called system 1 hereinafter and is designed according to standard ISO 14443 for contactless communication. System 1 has a communication device 2 shown in detail in FIG. 2 and a first data carrier 3 and a second data carrier 3', which are of identical structure. What is different is that first identification information I1 is contained in the first data carrier 3 and second identification information I2, different from the first identification information I1, is contained in the second data carrier 3'. The reference symbols of all components of the second data carrier 3' are indicated by an apostrophe, when they are referred to in the following description.

The communication device 2 is designed for contactless communication with each of the two data carriers 3 and 3', after the respective data carrier 3 or 3' has transmitted its identification information I1 or I2 to the communication device 2 without collision with some other identification information and as a result of that and preferably by means of the respective identification information I1 or I2, can respond in an unambiguous manner. For this purpose, a carrier signal C can be generated and delivered by means of the communication device 2. By means of carrier signal C, the data carriers 3 and 3' can be supplied with energy as soon as they are brought within a communication zone of communication device 2. By means of the carrier signal, information can moreover be exchanged between the data carriers 3 and/or 3' and the communication device 2, and for the purpose of transmitting information from communication device 2 to the carrier signal C is subjected to amplitude modulation, and for the purpose of transmitting information from one of the data carriers 3 and/or 3' the carrier signal C is subjected to load modulation. For example, an inventory command IC1 can be delivered from the communication device 2, causing in data carriers 3 and 3' essentially simultaneous transmission of the respective identification information I1 and I2 in the form of information units IU and IU', which in the present case are given by bits coded according to the Manchester code, as discussed in detail below.

Figure 2:
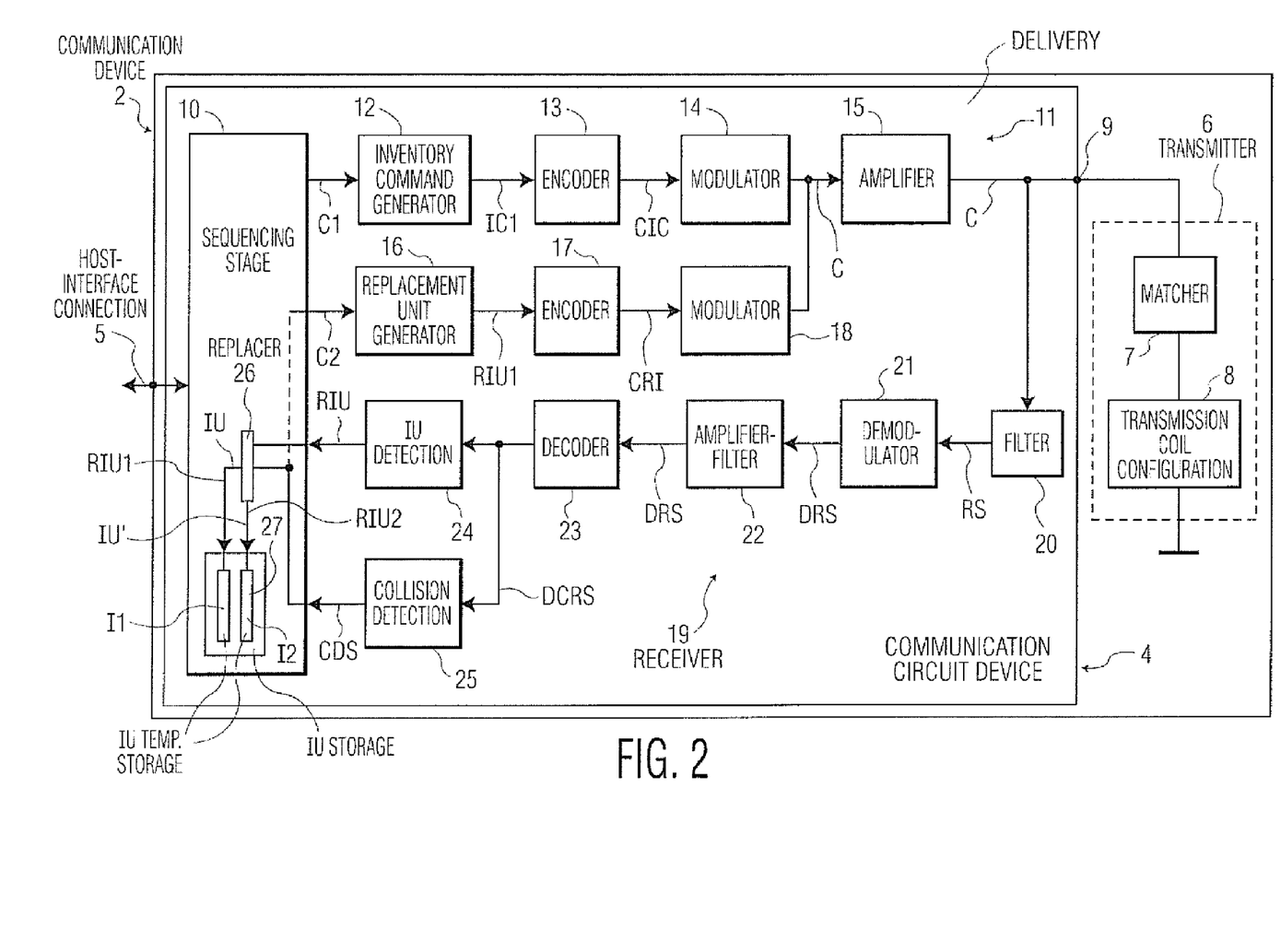
FIG. 2 shows, similarly to FIG. 1, a communication device according to the invention of the communication system according to FIG. 1 in detail.

The communication device 2, shown in detail in FIG. 2, has a communication device circuit 4, which has a host-interface connection 5, by which it can be connected to a so-called host computer, so that it can exchange information with the host computer, though this is not discussed in more detail. The communication device 1 also has transmitting means 6, comprising matching means 7 and a transmission coil configuration 8, it being possible to produce inductive coupling with the data carriers 3 and/or 4 in a known manner by means of the transmission coil configuration 8, and it being possible to achieve matching between a circuit impedance and an impedance of the transmitting means 6 in a known manner by means of the matching means 7.

The communication device circuit 4 also has a transmitting means connection 9, by which the transmitting means 6 are connected to the communication device circuit 4.

The communication device circuit 4 also has a sequencing stage 10, which is provided for controlling the information processing sequence in communication device circuit 4 and which in the present case is in the form of a so-called microcontroller, by means of which information can be exchanged both with the host computer and with each of the data carriers 3 and 3'.

The communication device circuit 4 also has first delivering means 11, which are designed for delivering information via the transmitting means connection 9 to the transmitting means 6 depending on a first control signal C1 or a second control signal C2 that can be generated by means of the sequencing stage 10. In the present case the information is formed by the inventory command IC1 or by a replacement information unit (RIU1), further details of which are given below. The first delivering means 11 comprise inventory command generating means 12 and first encoding means 13 and first modulating means 14 and first amplifying means 15. The inventory command generating means 12 are designed for generating and delivering the inventory command IC1 to the encoding means 13 on receiving the first control signal C1, it being possible for an inventory command CIC coded according to the Manchester code to be generated and delivered by said encoding means 13. The modulating means 14 are designed for receiving the coded inventory command CIC and, as a function thereof, for generating and delivering the carrier signal C, which has modulated and unmodulated signal segments depending on the coded inventory command CIC, to the amplifying means 15, from which the carrier signal C can be delivered to the transmitting means 6, by means of which it can be transferred from communication device 1 to the data carriers 3 and 3'.

The first delivering means 11 also have replacement information unit generating means 16 and second encoding means 17 and second modulating means 18. The replacement information unit generating means 16 are designed so that, on receiving the second control signal C2 from the sequencing stage 10, they generate and deliver the first replacement information unit RIU1 to the second encoding means 17. The second encoding means 17 are designed for encoding the first replacement information unit RIU1 according to the Manchester code and for delivering the coded first replacement information unit CRI to the second modulating means 18, in which, analogously to the first modulating means 14, the carrier signal C can be modulated according to the coded replacement information unit CRI and the carrier signal C is delivered to the amplifying means 15, so that the replacement information unit RIU1 can also be transmitted to the data carriers 3 and 3' by means of the transmitting means 6. Accordingly, the first delivering means 11 are designed for contactless delivery of the first replacement information unit RIU1.

The communication device circuit 4 also has receiving means 20, which are designed for contactless reception of an information unit RIU receivable from data carriers 3 and/or 3' by means of the load-modulated carrier signal C. For this purpose the receiving means 19 have filtering means 20, which are connected to the transmitting means connection 9. The receiving means 19 also have demodulating means 21 and amplifying-filtering means 22 and decoding means 23 and information unit detecting means 24.

The filtering means 20 are designed for filtering the carrier signal C that arises at the transmitting means connection 9. The first filtering means 20 are also designed for delivering a receive signal RS representing the filtered carrier signal C to the demodulating means 21, by means of which the receive signal RS can be demodulated and can be delivered as a demodulated receive signal DRS to the amplifying-filtering means 22. By means of the amplifying-filtering means 22, the demodulated receive signal DRS can be amplified and filtered again, and can be delivered as a filtered and demodulated receive signal DRS to the decoding means 23, which are designed for decoding the demodulated receive signal DRS and for delivering a decoded receive signal DCRS. The decoded receive signal DCRS can be supplied to the information unit detecting means 24, which are designed for detecting and for delivering the information unit RIU represented by the decoded receive signal DCRS to the sequencing stage 10.

The communication device circuit 4 also has collision detection means 25, to which the decoded receive signal DCRS can be supplied from the decoding means 23. The collision detection means 25 are designed for detecting that the received information unit RIU, which is represented by the decoded receive signal DCRS, represents a collision of two different information units IU and IU' arising essentially simultaneously, and of these two different information units IU and IU', the one information unit IU originates from the first data carrier 3 and the other information unit IU' originates from the second data carrier 3'. The collision detection means 25 are designed for generating, as a result of detecting said collision, a collision detection signal CDS and for delivering the collision detection signal CDS to the sequencing stage 10.

The communication device circuit 4 also has replacing means 26, which are designed for interacting with the collision detection means 25 and, for the case where a collision of different information units IU and IU' is detected by the collision detection means 25, for replacing the received information unit RIU with the first replacement information unit RIU1 established by the communication device 1, said first replacement information unit RIU1 serving instead of the received information unit RIU representing the collision, as the information unit IU that originates from the first data carrier 3. In the present case it is established by definition, i.e. from or via the communication device 1, that the first replacement information unit RIU1 represents the logic ONE value.

The sequencing stage 10 contained in the communication device circuit 4 also has information unit storage means 27, which are designed for storing information units IU and/or IU'. The information unit storage means 27 also have information unit temporary storing means 28, which are designed for buffering each information unit IU received at the communication device 1 prior to collision detection, as an information unit IU' originating from the second data carrier 3'. It is envisaged, in sequencing stage 10, that a copy of the information units IU that were received prior to the occurrence of a collision is created in the information unit buffer means 28 as the information units IU' by means of the sequencing stage 10.

The replacing means 26 are also designed for again replacing the previously established first replacement information unit RIU1 with a second replacement information unit RIU2 that deviates from it and is used instead of the received information unit RIU, representing the collision, as the information unit IU' which originates from the second data carrier 3' and which caused the collision. By means of sequencing stage 10, this second replacement information unit RIU2 can be stored in the information unit temporary storing means 28, that is, instead of the received information unit RIU, which caused the collision.

The communication device circuit 4 also has continue command generating means, which in the present case are constructed in the form of the inventory command generating means 12. The sequencing stage 10 is also designed for monitoring whether all information units IU of the first identification information I1 to be received from the first data carrier 3 have been received. As soon as all information units IU of the first identification information I1 have been received, the sequencing stage 10 is designed for again generating and delivering the first control signal C1 to the inventory command generating means 12. The inventory command generating means 12 are then designed for generating a continue command, which is formed in the present case by the inventory command IC1, and for delivering the continue command with the assistance of the delivering means 11, said continue command having no effect in the first data carrier 3, and effecting, in the second data carrier 3', continuation of delivery of the information units 'U' of the second identification information I2 with the information unit IU' that comes after the information unit IU' that previously caused detection of the collision. For the case where, as in the present example, only two data carriers 3 and 3' are provided within the communication zone of the communication device 1, the information units IU' that come after the information unit IU' that caused the collision are then delivered from the second data carrier 3' collision-free to the communication device 1 and received with the communication device 1 by the receiving means 19 and stored in the information unit buffer means 28 as the information units IU' that originate from the second data carrier 3'.

It should be mentioned at this point that for the case where the established first replacement information unit RIU1 represents the logic ZERO value, the data carriers 3 and 3' exchange roles and the second data carrier 3' is first to deliver its identification information I2 completely to the communication device 1 and only after that, the first data carrier 3 completes its identification information I1 beginning with the information unit IU that occurs after the information unit IU that caused the collision.

It should further be mentioned at this point that for example when three data carriers 3, 3' and 3" are present, the case may arise where, in a first collision, the first data carrier 3 is selected by means of the first replacement information unit RIU1 and sends its identification information I1 completely to the communication device 1 and then the remaining two data carriers 3' and 3" begin jointly to complete the respective identification information I2 and I3. During this, a second collision may occur, so that this group of two data carriers 3' and 3" breaks down again, and for example the second data carrier 3' takes on the role of the first data carrier 3 and the third data carrier 3" takes on the role of the second data carrier 3', because the second data carrier 3' is selected on account of the first replacement information unit RIU1 being received again. In this case, therefore, the second data carrier 3' will send its identification information I2 completely to the communication device 2 first, and then the third data carrier 3" will complete its identification information I3 beginning with the information unit IU" that comes after the information unit IU" that caused the collision.

Figure 3:
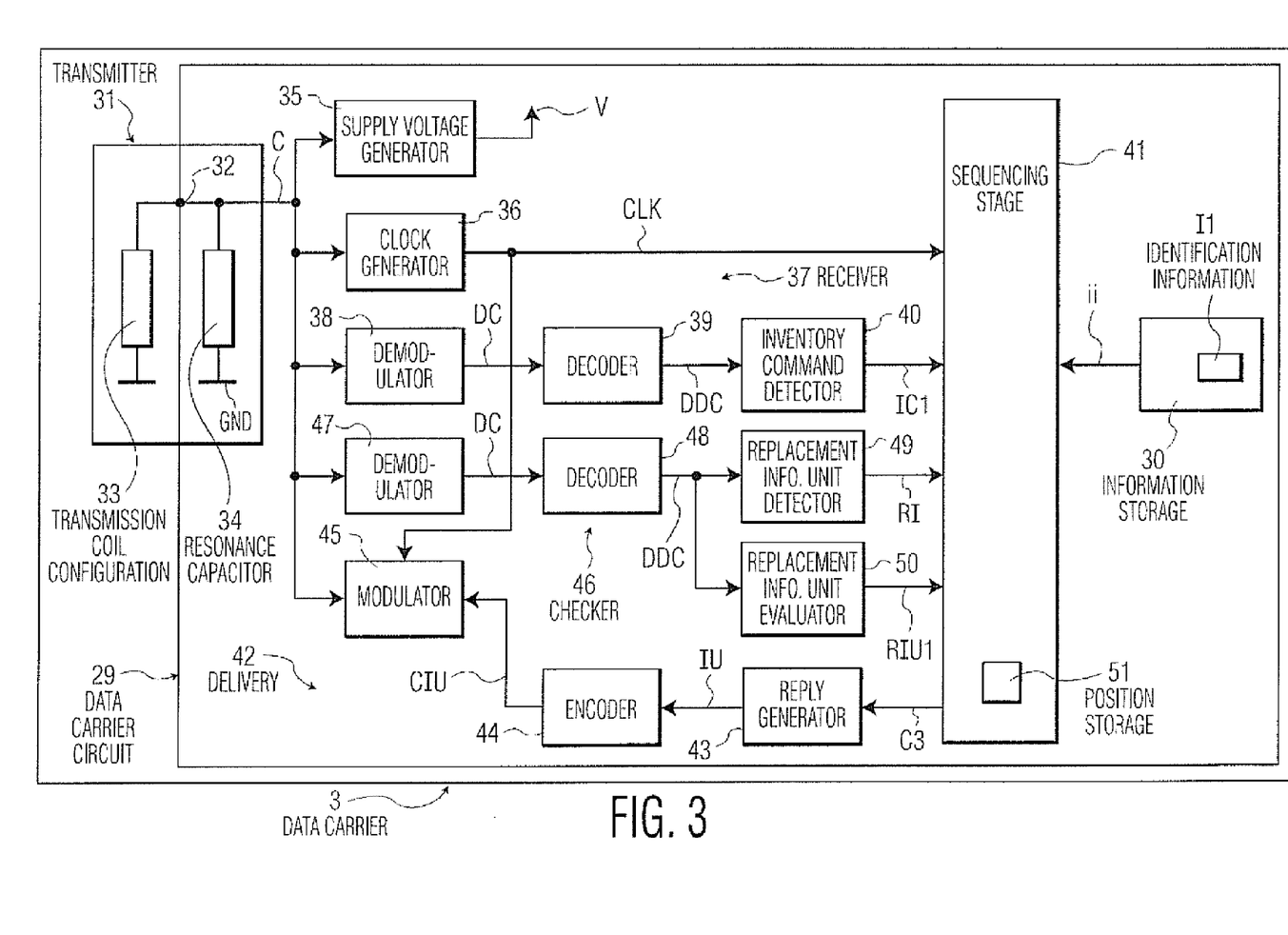
FIG. 3 shows, similarly to FIG. 1, a data carrier according to the invention of the communication system according to FIG. 1 in detail.

The data carrier 3 shown in FIG. 3 has a data carrier circuit 29, which has identification information storing means 30. Data carrier 3 also has second transmitting means 31, which are designed for interacting with the first transmitting means 6 of the communication device 1. The data carrier circuit 29 has a transmitting means connection 32, by which it is connected to the second transmitting means 31. The second transmitting means 31 have a transmitting coil configuration 33, which is designed and provided for inductive coupling with the transmitting coil configuration 8 of the communication device 1. In addition, within the data carrier circuit 29, a resonance capacitor 34, assigned to the transmitting means 30, is provided, so that the second transmitting means 31 form a resonance circuit, by means of which the energy supply mentioned at the beginning for communication device 1 and the aforementioned information exchange can be performed.

The data carrier circuit 29 also has supply voltage generating means 35, which by utilizing the carrier signal C occurring at the transmitting means connection 32, are designed for generating and delivering a supply voltage for the data carrier circuit 29 against a reference potential GND.

The data carrier circuit 29 also has clock generation means 36, which are also connected to the transmitting means connection 32 and, by utilizing the signal occurring at the transmitting means connection 32, are designed for generating and delivering a clock signal CLK for the data carrier circuit 29. The clocking means 36 are designed as clock-pulse regenerating means.

Data carrier circuit 29 also has second receiving means 37, which are designed for receiving and detecting the inventory command IC1 and the continue command. For this purpose the receiving means 37 have second demodulating means 38 and second decoding means 39 and inventory command detecting means 40. The second demodulating means 38 are connected to the transmitting means connection 32 and are designed for demodulating the carrier signal C that can be read off there, and for delivering a demodulated carrier signal DC to the second decoding means 39. The second decoding means 39 are designed for decoding the demodulated carrier signal DC and for delivering the decoded and demodulated carrier signal DDC to the inventory command detecting means 40. The inventory command detecting means 40 are designed for detecting the inventory command IC1 communicated to data carrier 3 by means of the carrier signal C and for delivering this inventory command IC1 to a second sequencing stage 41. The second sequencing stage 41 is designed and provided in the data carrier circuit 29 for controlling the information processing sequence, such as the received inventory command IC1 and the continue command and subsequent delivery or interruption and subsequent continuation of delivery of information units IU of the identification information I1.

Data carrier circuit 29 also has delivering means 42, which are constructed with the aid of the sequencing stage 41 and with the aid of reply generating means 43 and third encoding means 44 and third modulating means 45. The delivering means 42 are designed, as a result of receiving the inventory command IC1 and with the aid of the sequencing stage 41, for read-out of the identification information I1 in the form of its information units IU from the identification information storage means 30 and for delivering the information units IU as a component of a third control signal C3 to the reply generating means 43. The reply generating means 43 are designed, by utilizing the third control signal C3, for generating and delivering reply information in response to the inventory command IC1, said reply information having, as an essential component, an information unit IU of the identification information I1. The third encoding means 44 are designed for encoding the reply information according to the Manchester code and for delivering the coded reply information CIU to the third modulating means 45. The third modulating means 45 are designed for load-modulation of the carrier signal C occurring at the transmitting means connection 32 in relation to the coded reply information CIU received.

Data carrier circuit 29 also has checking means 46, which are designed for checking whether, after delivering the information unit IU, a first replacement information unit RIU1 established by communication device 1 can be received by communication device 1. For this purpose, the checking means 46 have third demodulating means 47 and third decoding means 48 and replacement information unit detecting means 49 and replacement information unit evaluation means 50. The third demodulating means 47 are designed for demodulating the carrier signal C occurring at the transmitting means connection 32 and for delivering the demodulated carrier signal DC to the third decoding means 48. The function of the third demodulating means 47 can also be fulfilled with the second demodulating means 38, leading to a simpler circuit design. The third decoding means 48 are designed for decoding the demodulated carrier signal DC and for delivering a decoded and demodulated carrier signal DDC to the replacement information unit detecting means 49 and the replacement information unit evaluation means 50. The replacement information unit detecting means 49 are designed, by utilizing the decoded and demodulated carrier signal DDC, for detecting whether the carrier signal C has the first replacement information unit RIU1, after which a detection signal RI can be sent from the replacement information unit detecting means 49 to the second sequencing stage 41. The replacement information unit evaluation means 50 are designed for evaluating the decoded and demodulated carrier signal DDC with respect to the information it contains, and in the present case only the first replacement information unit RIU1 can be evaluated and sent to the second sequencing stage 41. However, it should be mentioned at this point that it is also possible for replacement information units that are different from one another to be communicated to data carrier 3, then by means of the replacement information unit evaluation means 50 it is also possible for different replacement information units to be evaluated and sent to the second sequencing stage 41.

The delivering means are further designed for continuing the delivery of the identification information I1 with the information unit IU that comes after the information unit IU sent previously to the communication device 1, if it is established at the checking means 46 that either no established first replacement information unit RIU1 was delivered from communication device 2 and subsequently received, or a first replacement information unit RIU1 established by communication device 1 is received and additionally the received established first replacement information unit RIU1 is identical with the information unit previously sent to communication device 1. The delivering means 42 are further designed for interrupting the delivery of the identification information I1 if it is established at the checking means 46 that the established first replacement information unit RIU1 from communication device 1 is received and the received first replacement information unit RIU1 is identical with the information unit IU previously sent to the communication device.

The delivering means 42 also have position storing means 51 provided in the sequencing stage 41, by means of which at least the position of the information unit IU coming after the information unit IU sent prior to reception of the established first replacement information unit RIU1 can be flagged. This occurs in the present case by storage of a pointer to the information unit IU coming after the information unit IU that caused the collision. The delivering means 42 are further designed for continuing the delivery of the information units IU of the identification information I1 with the information unit IU that corresponds to the marked position, when reception of the continue command at the second receiving means 37 is detected.

The function of the communication device 2 according to FIG. 2 and the function of the data carrier 3 according to FIG. 3 will now be discussed, on the basis of an embodiment of system 1 according to FIG. 1. In accordance with this embodiment, it is to be assumed that the identification information I1 of the first data carrier 3 has the binary values "1001001" ("ONE ZERO ZERO ONE ZERO ZERO ONE") and the identification information I2 of the second data carrier 3' has the binary values "1000011" ("ONE ZERO ZERO ZERO ZERO ONE ONE"). It should further be assumed that the two data carriers 3 and 3' are located within the communication zone of communication device 2. Since identification information I1 and identification information I2 are different from one another, at first an anticollision process is started and processed in system 1, which is provided for managing a collision of information units IU and IU', said information units IU and IU' being sent by the respective data carrier 3 or 3' to communication device 2, and with a collision of this kind, which in this case is bit-by-bit, the information unit RIU received at communication device 2 represents an essentially simultaneous occurrence of the different information units IU and IU', and of these different information units IU and IU', the one information unit IU originates from the first data carrier 3 and the other information unit IU' originates from the second data carrier 3' and both information units IU and IU' are located at the fourth position of the respective identification information I1 and I2 respectively, and cause the collision. The anti-collision method comprises a receiving method and a method of delivery, to be described in detail below.

The receiving method is provided for the contactless reception of identification information I1 or I2 respectively, which is stored in data carrier 3 or 3' and can be received from data carrier 3 or 3' in a contactless manner in the form of information units IU or IU' at communication device 2, and is prepared by means of communication device 2 or the communication device circuit 4. The method of delivery is provided for the contactless delivery of identification information I1 or I2, said identification information I1 or I2 being stored in data carrier 3 or 3' and being transmissible in a contactless manner in the form of information units IU or IU', to communication device 2, and is prepared by means of data carrier 3 or 3', i.e. essentially by means of its data carrier circuit 4 or 4'.

Figure 4:
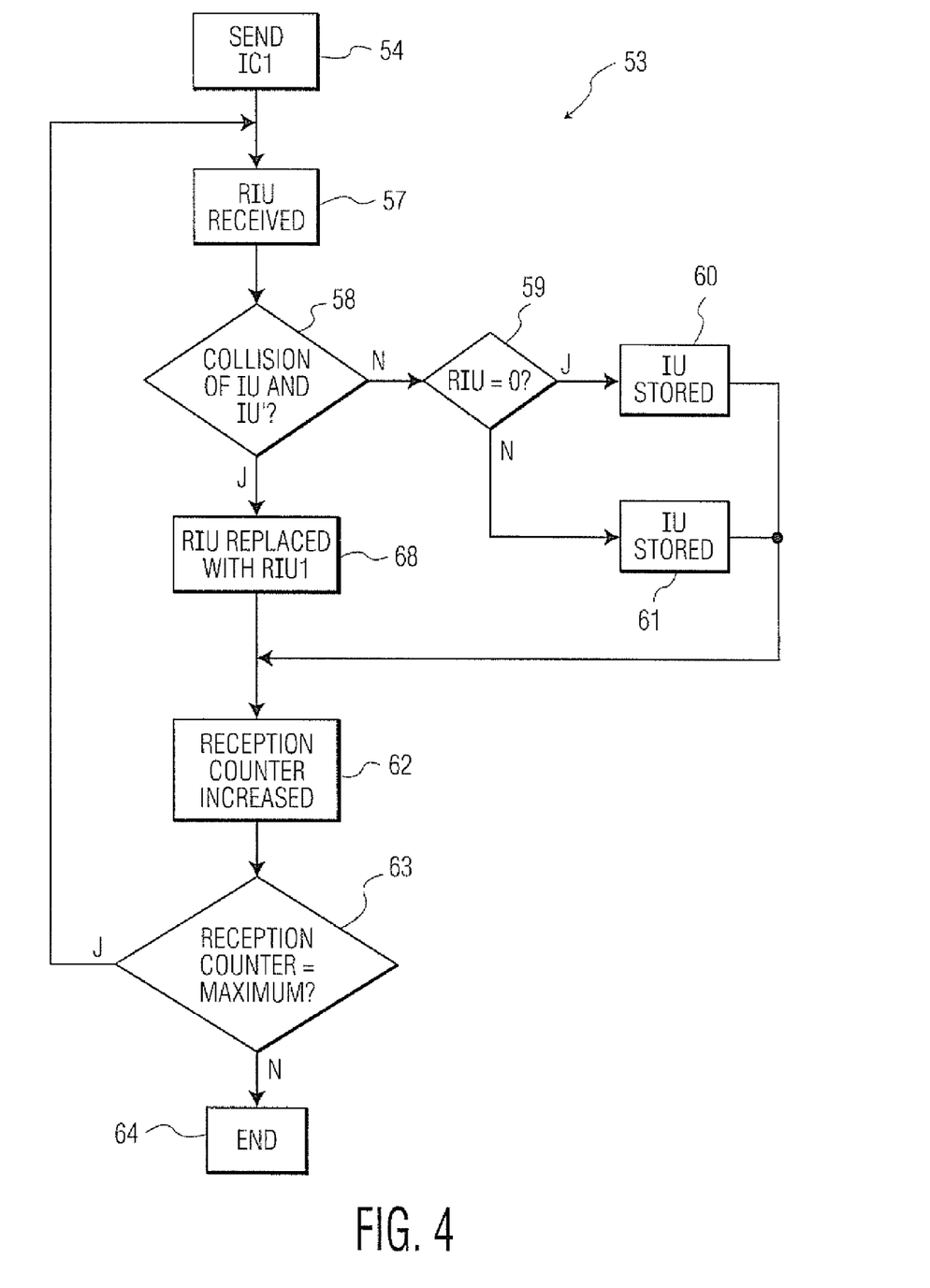
FIG. 4 shows a flow diagram for a receiving method according to the invention.

According to the first flow chart 52 shown in FIG. 4, the receiving method is started in a block 54 from communication device 2 by sending the inventory command IC1 by means of the carrier signal C, with an information unit reception counter being set to the value Zero (0).

Figure 5:
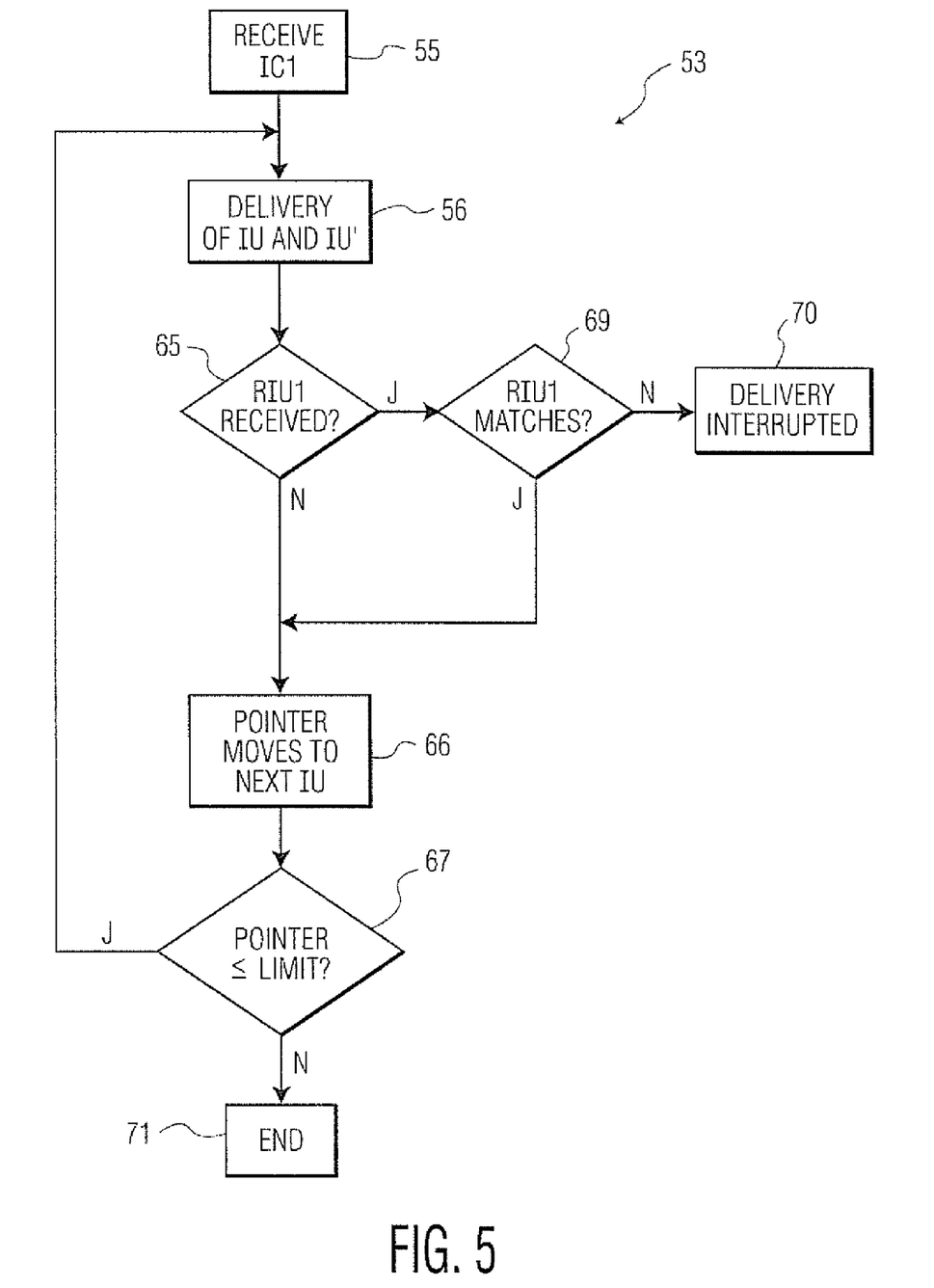
FIG. 5 shows a flow diagram for a transmission method according to the invention.

According to the second flow diagram 53 shown in FIG. 5, the method of delivery is started in block 55 by reception of the inventory command IC1 simultaneously at data carrier 3 and at data carrier 3'. Then, in block 56, delivery of the respective identification information I1 and I2 is started with delivery of the respective first information unit IU or IU', both of which have the binary value ONE in the present case, by each of the data carriers 3 and 3' by means of the respective delivering means 42 and 42'. In communication device 2, by means of the first receiving means 19, an information unit RIU is received in block 57 in accordance with the receiving method and it is checked in block 58 whether a collision of two different information units IU and IU' occurring essentially simultaneously is represented by the received information unit RIU. As this is not established in communication device 2 by means of the collision detection means 25, the receiving method is continued in a block 59, in which it is decided whether the received information unit RIU represents the binary value ONE or the binary value ZERO.

For the case where the received information unit RIU represents the binary value ZERO, the receiving method is continued in a block 60, in which, by means of the information unit detecting means 24, the first information unit IU of the identification information I1 is stored in the information unit storage means 27. For the case where the checking in block 59 shows that the received information unit RIU represents the binary value ONE, the receiving method is continued in block 61, in which, by means of the information unit detecting means 24, a bit with the binary value ONE is stored as the first information unit IU of the identification information I1 in the information unit storage means 27, which applies in the present case.

Then the receiving method is continued in block 62, in which the information unit reception counter is increased by the value One (1).

After that, the receiving method is continued in a block 63, in which it is checked whether the information unit counter has reached a maximum value, in the present case the value Seven (7). For the case where the information unit counter has reached the value Seven (7), the receiving method is terminated in block 64, as in this case all information units IU of the first identification information I1 have already arrived at the communication device 2. For the case where the information unit counter has not reached the value Seven (7), the receiving method is continued in block 57.

In the method of delivery, in a block 65, after delivery of the first information unit IU or IU', it is checked at data carriers 3 or 3', by means of the respective checking means 46 and 46', whether a first replacement information unit RIU1 established by communication device 2 can be received from communication device 2 after delivery of the respective information unit IU and IU'.

As this is not so in the present case, the method of delivery is continued in a block 66, in which a pointer to the next information unit to be delivered is established in the respective position storage means 51 and 51' by means of the sequencing stage 41 or 41'.

Then the method of delivery is continued in a block 67, in which it is checked whether the flagged pointer is less than or equal to a pointer limit, which represents the last information unit IU or IU' of the respective identification information I1 or I2 to be delivered. For the case where the flagged pointer has not yet exceeded the pointer limit, the method of delivery is continued in block 56 by delivering the second information unit IU or IU', which in the present case is given in each case by the binary value ZERO. Since identical binary values are provided both at the second position and at the third position of identification information I1 and of identification information I2, the previously described receiving method and the method of delivery are processed as described above. The three information units "100" received collision-free are stored as belonging to the identification information I1 in communication device 2 with the information unit storage means 27, because at this stage the existence of the second data carrier 3' is not yet known.

After that, in the method of delivery, the fourth information unit IU or IU' of the respective identification information I1 or I2 is delivered by the respective data carrier 3 or 3'. In accordance with the method of delivery, in block 56 an information unit IU representing the binary ONE value, is delivered by the first data carrier 3. Simultaneously, an information unit IU representing the binary ZERO value, is delivered from the second data carrier 3'. In accordance with the receiving method, in block 57, in communication device 2, an information unit RIU is received, which information unit RIU represents a mixed state consisting of a binary ONE and a binary ZERO on the basis of the encoding in the Manchester code. It should be mentioned at this point that an auxiliary carrier can also be provided, which for its part can be coded according to the Manchester code. Furthermore, other codes can also be employed, such as the so-called FM0 Code, which is used for example in the UHF range, or the F2F Code.

Then it is detected in block 58 that the received information unit RIU represents a collision of the two different information units IU and IU' occurring essentially simultaneously, and of which two different information units IU and IU' the one information unit IU originates from the first data carrier 3 and the other information unit IU' originates from the second data carrier 3'. Next, the receiving method is continued in a block 68, in which the received information unit RIU is replaced, by means of the replacing means 26, with the first replacement information unit RIU1 established by communication device 2, in the present case representing the binary value ONE, which is used instead of the information unit RIU representing the collision, as the information unit IU that originates from the first data carrier 3. The first replacement information unit RIU1 established in this way is stored, by means of the information unit storage means 27, at the fourth position of the first identification information I1 that is to be received. At the same time, in accordance with the receiving method, the first replacement information unit RIU1 is delivered to the data carriers 3 or 3' in a contactless manner.

At the first data carrier 3, in accordance with the method of delivery, it is checked and established in block 65 that the first replacement information unit RIU1 is received, because the structure of the carrier signal C has an amplitude modulation caused by the communication device 2.

Then the method of delivery is continued at data carrier 3 with block 69, in which it is checked whether the received first replacement information unit RIU1 represents the binary value ZERO. As this is not so in the present case, at the first data carrier 3 the method of delivery is continued in block 60, whereby it was decided that delivery of the first identification information I1 should continue with the information unit IU coming after the information unit IU sent previously to the communication device 2—i.e. with the fifth information unit—because the first replacement information unit RIU1 established by communication device 2 is received and the received established first replacement information unit RIU1 is identical with the information unit IU, representing the binary ONE value, sent previously to communication device 2. Accordingly, the method of delivery is continued in block 66.

Similarly, at data carrier 3' or in the method of delivery taking place there, it is also established in block 65 that after delivery of the fourth information unit IU', the first replacement information unit RIU1 established by communication device 2 can be received from communication device 2. In accordance with the method of delivery, it is established in block 69 that the received first replacement information unit RIU1 is not identical with the fourth information unit IU', representing the binary value ZERO, sent previously to communication device 2, and it is branched to block 70, in which delivery of the identification information I2 is interrupted. At the same time, in the method of delivery, in a block 70 the position of the fifth information unit IU' coming after the fourth information unit IU' delivered prior to reception of the first replacement information unit RIU1 is flagged by means of the pointer.

Simultaneously with this, in essence in the receiving method it happens that in block 68 each information unit RIU received at communication device 2 prior to collision detection is buffered by the information unit storage means 27, as the information unit IU' originating from the second data carrier 3'. This takes place by creation of a copy of the information units IU received at communication device 2 prior to collision detection, which were stored in the information unit storage means 27 as belonging to the first information unit I1. Furthermore, in block 68 the previously established first replacement information unit RIU1 is replaced by a second replacement information unit RIU2 that differs from it—in the present case is complementary to it—representing in the present case the binary ZERO value, and instead of the information unit representing the collision, is used and stored in the fourth position of the information unit I2 receivable from data carrier 3', as the information unit RIU that originates from the second data carrier 3'.

Starting from this point of time, the second data carrier 3' has already interrupted delivery of its identification information I2 and only the first data carrier 3 is still sending its identification information I1 and the information units IU contained in the identification information I1 and still outstanding to the communication device 2, therefore in communication device 2 the receiving method is processed omitting block 68, since the information units IU received at communication device 2 are received collision-free. Then the method of delivery comes to an end at a block 71.

After the first identification information I1 has been received completely at communication device 2 and the receiving method for the identification information I1 has ended at block 64, the receiving method is started again at block 54 by delivery of the continue command. As a result, at the second data carrier 3', continuation of delivery of the information units IU' of the second identification information I2 is triggered with the fifth information unit IU' that comes after the fourth information unit IU', which previously caused collision detection. At the second data carrier 3', the method of delivery is then started again at block 55, subject to the proviso that after the continue command is received by communication device 2, delivery of the information units IU' of the second identification information I2 continues with the information unit IU' that corresponds to the flagged position, namely the fifth position. Because the first data carrier 3 no longer delivers any information units at this point of time, the method of delivery will be processed for the remaining three information units IU' omitting blocks 69 and 70.

By providing the measures according to the invention, an anti-collision method that is as efficient as possible is created, in which neither of the data carriers 3 or 3' has to repeat the delivery of the information units IU and IU' originating from it.

It should be mentioned at this point that instead of the transmission coil configurations 8 and 33, it is also possible to provide antenna configurations or transmission configurations operating capacitively.

It should further be mentioned that the continue command can also be effected by a separate command that is different from the inventory command IC1 and that the communication device circuit 4 can be designed for generating this separate command IC2 and the data carrier circuit 29 can be designed for processing it.

It should be mentioned that the clock signal CLK can also be generated by an internal oscillator.

It should further be mentioned that the measures according to the invention can also be used in a so-called full-duplex communication system, in which communication between the communication device 2 and the data carrier 3 takes place via communication channels that can be separated from each other.

The invention claimed is:

1. A receiving method for contactless reception of identification from a data carrier through information units by a communication device, the method comprising:
   receiving a received information unit, wherein said communication device uses said received information unit as a first information unit originating from a first data carrier;
   waiting to deliver a first replacement information unit to at least the first data carrier and a second data carrier in a contactless manner until a collision is detected;
   detecting said collision when said communication device receives at least two different information units with different values essentially simultaneously, wherein the first information unit originates from the first data carrier and a second information unit originates from the second data carrier;
   using, as said first information unit originating from the first data carrier, a first replacement information unit established by the communication device instead of said received information unit only when the collision is detected; and
   delivering said first replacement information unit to at least the first data carrier and the second data carrier in a contactless manner when the collision is detected, wherein said first replacement information unit halts only the second data carrier from continuing delivery of an information unit immediately following the previously delivered second information unit.

2. The receiving method of claim 1, further comprising:
   storing said received information unit as the second information unit originating from the second data carrier prior to said collision.

3. The receiving method of claim 2, further comprising:
   using a second replacement information unit instead of the previously established first replacement unit, wherein the second replacement information unit has a bit value opposite the value of the first replacement information unit and the communication device uses the second replacement unit as the second information unit originating from the second data carrier instead of the received information unit.

4. The receiving method of claim 3, said receiving method further comprising:
   receiving all information units originating from the first data carrier until completion after the collision is detected;
   generating and delivering a continue command to the second data carrier in a contactless manner, wherein said continue command directs the second data carrier to deliver the second information unit, beginning with an information unit immediately following a previously delivered information unit.

5. A delivering method from a data carrier to a communication device for contactless delivery of identification information of a data carrier through information units, said method comprising:
   delivering an information unit;
   checking for reception at said data carrier of a first replacement unit after said delivery of the information unit, wherein the data carrier receives said first replacement unit only when a collision occurs;
   continuing delivery of a further information unit, wherein the data carrier delivers an information unit immediately following the information unit previously delivered when the data carrier does not receive said first replacement information unit;
   and halting the delivery of information units when the data carrier delivers all of said identification information.

6. The delivering method of claim 5, further comprising:
   halting delivery of an information unit, wherein the data carrier halts delivery of the information unit immediately following the information unit previously delivered when the data carrier receives a first replacement information unit and said first replacement information unit is not identical to the previously delivered information unit.

7. The delivering method of claim 6, wherein the data carrier continues delivering the information unit after reception of a continue command from the communication device, said delivery beginning with the information unit immediately following a previously delivered information unit.

8. A communication device circuit designed for contactless communication with a data carrier storing identification information, the communication device circuit comprising:
   receiving means for receiving a received information unit, wherein said communication device circuit uses said received information unit as a first information unit carrying a portion of a first identification information from a first data carrier;
   detecting means for detecting a collision of two different information units with two different values, wherein the first information unit originates from a first data carrier and a second information unit originates from a second data carrier and the communication device circuit transmits a first replacement unit only when said collision is detected;
   replacing means for replacing the received information unit with the first replacement information unit established by the communication device circuit to be used by said communication device circuit as the first information unit from the first data carrier when the collision is detected; and
   delivering means for contactless delivery of the first replacement information unit to at least the first data carrier and the second data carrier only when the collision is detected, wherein said first replacement information unit halts only the second data carrier from continuing delivery of an information unit immediately following the previously delivered second information unit.

9. The communication device circuit of claim 8, further comprising:
storing means for storing each received information unit prior to the collision as a unit originating from the second data carrier.

10. The communication device circuit of claim 9, wherein the replacing means are configured to:
replace the first replacement information unit with a second replacement information unit, wherein the communication device circuit uses the second replacement information unit as the information unit originating from the second data carrier instead of the received information unit when a collision occurs.

11. The communication device circuit of claim 10, further comprising continue command means configured to:
generate a continue command after the collision is detected, and
deliver said continue command,
wherein said continue command restarts the second data carrier delivering the second information unit beginning with the information unit immediately following the previously delivered second information unit.

12. A communication device comprising the communication device circuit of claim 8.

13. A data carrier circuit designed for contactless communication with a communication device that stores data carrier identification information, the data carrier circuit comprising:
delivering means for delivery of an information unit in a contactless manner; and
checking means for receiving a first replacement information unit established in the communication device after the data carrier circuit delivers said information unit, wherein the data carrier circuit receives the first replacement unit only when a collision occurs at the communication device;
wherein the delivering means continues delivery of the identification information, beginning with an information unit immediately following the previously delivered information unit when the data carrier circuit does not receive said first replacement information unit, and halts the delivery of information units when the data carrier circuit delivers all of the identification information.

14. The data carrier circuit of claim 13, further comprising:
means for halting delivery of the identification information when the data carrier circuit receives a first replacement information unit that is not identical to the previously delivered information unit; and
storing means of a position immediately following the previously delivered information unit.

15. The data carrier circuit of claim 14, further comprising:
receiving means for receiving a continue command from the communication device;
detecting means for detecting said continue command; and
continuing means for delivering an information unit immediately following the previously delivered information unit after detecting a continue command.

16. A data carrier comprising the data carrier circuit of claim 13.

* * * * *